W. P. SHATTUCK.
OUTING TRAILER.
APPLICATION FILED MAR. 11, 1916.
1,277,654.
Patented Sept. 3, 1918.
5 SHEETS—SHEET 2.
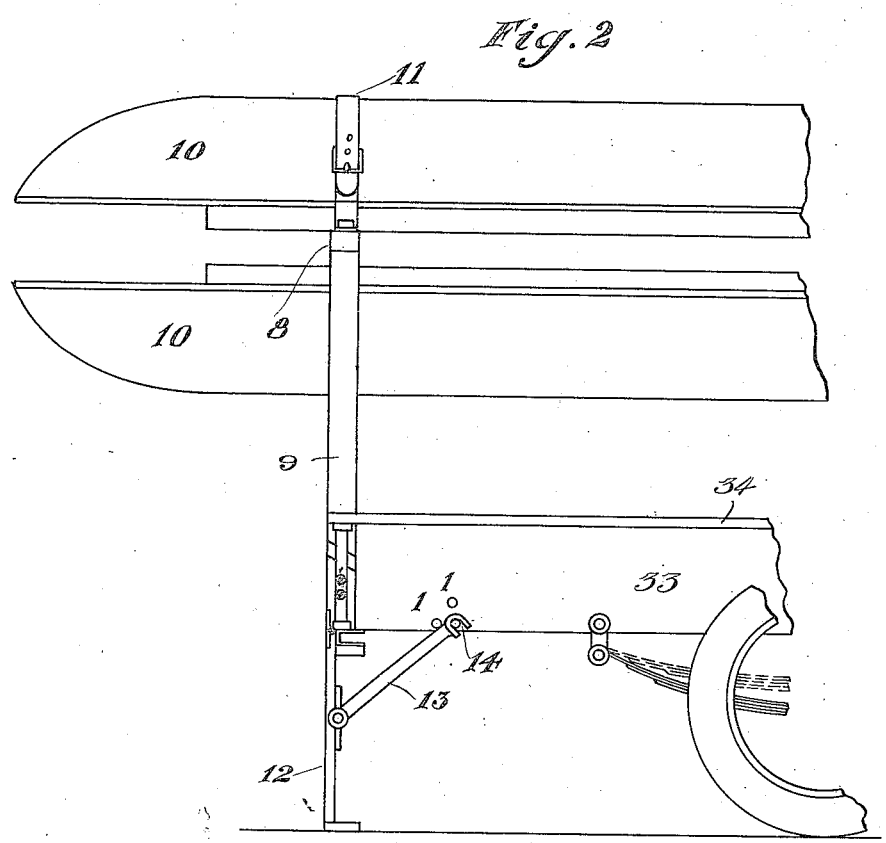
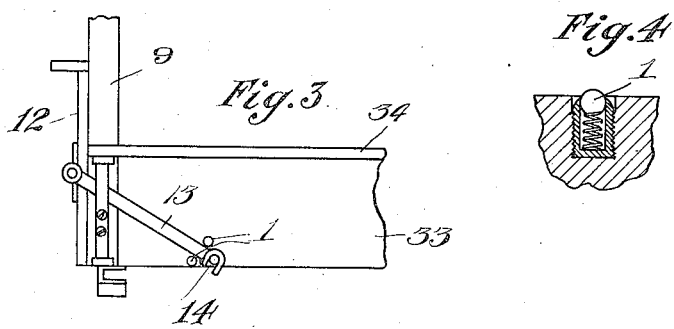
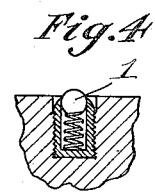
Inventor:
William P. Shattuck.
by C. P. Enochs
Attorney.

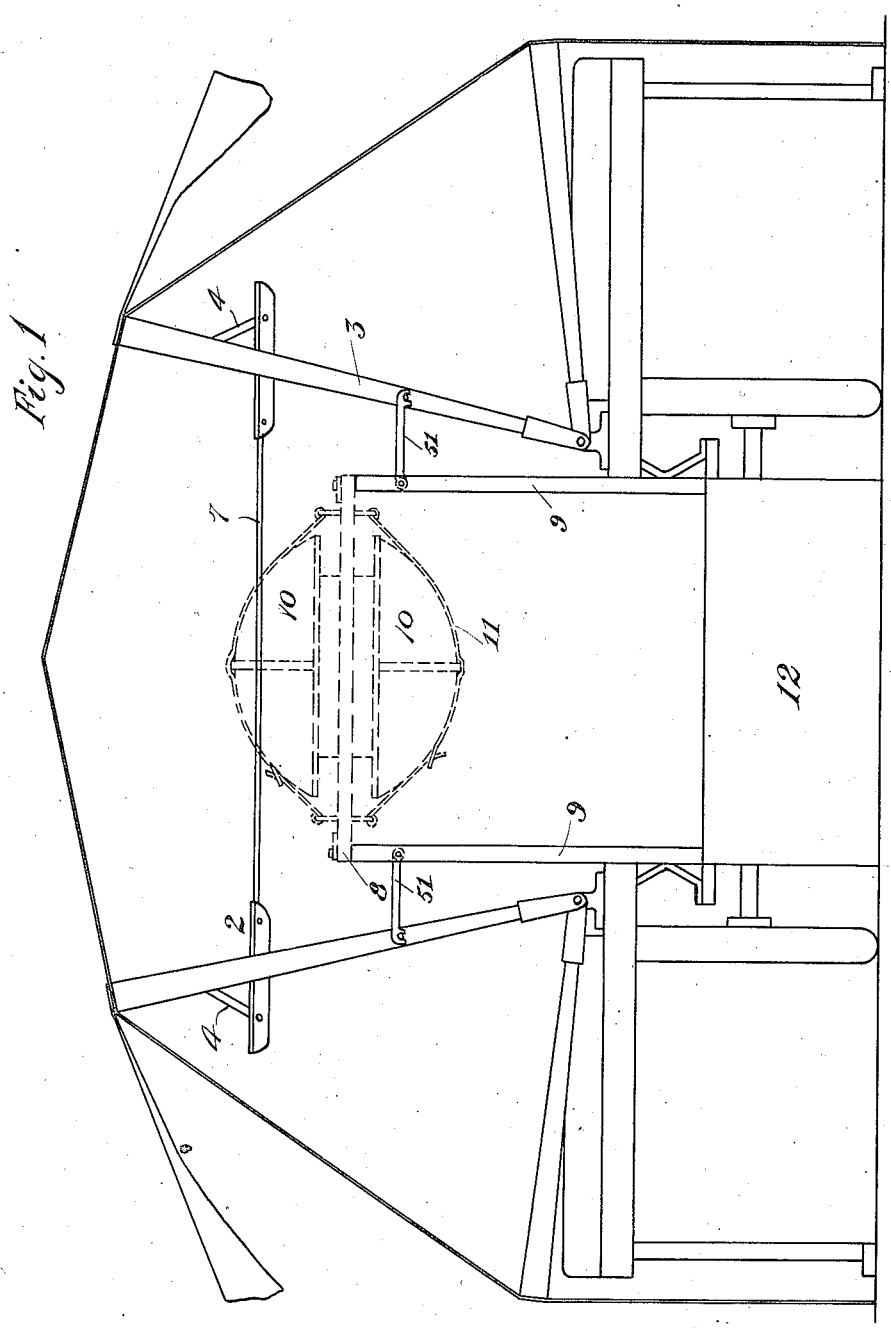

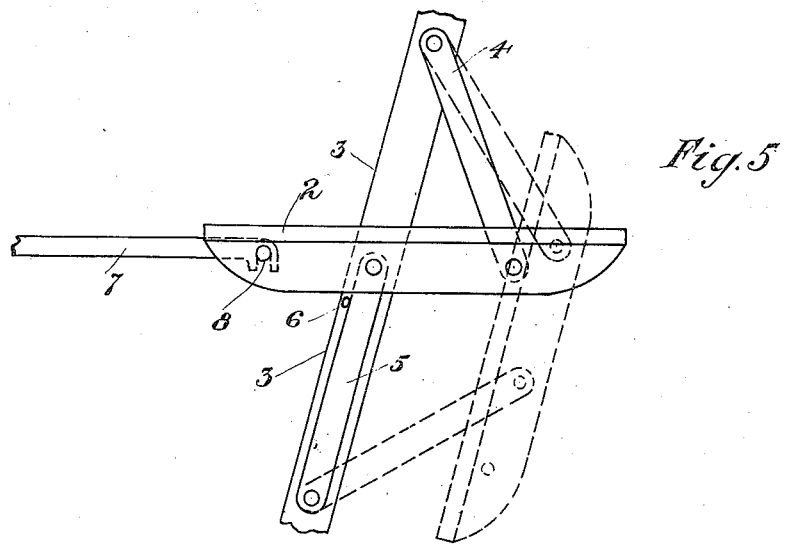
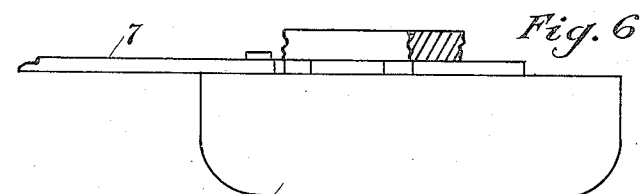
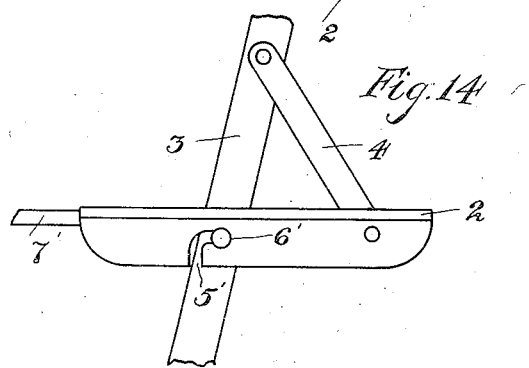

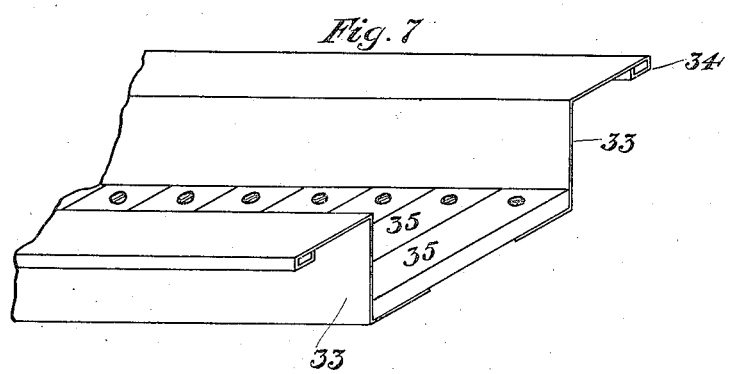
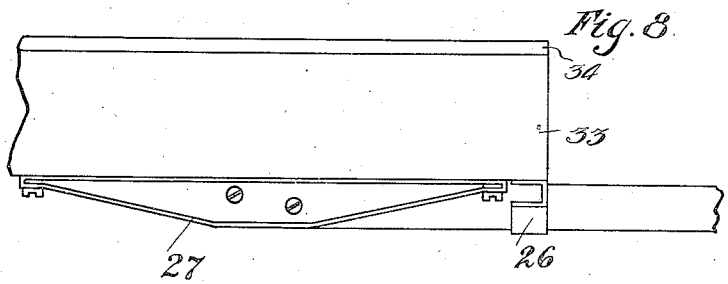
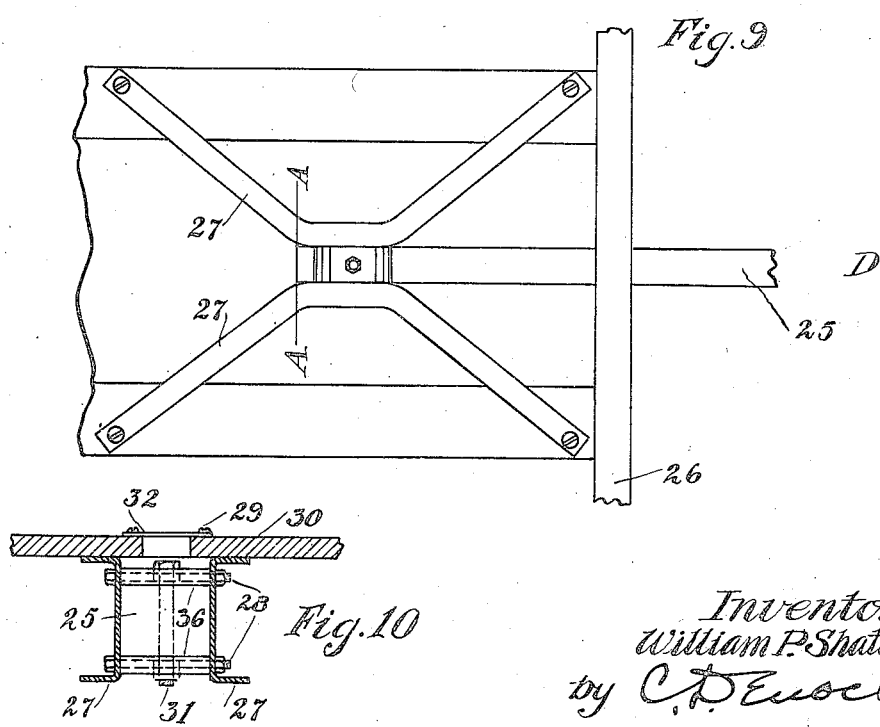

W. P. SHATTUCK.
OUTING TRAILER.
APPLICATION FILED MAR. 11, 1916.
1,277,654.
Patented Sept. 3, 1918.
5 SHEETS—SHEET 5.
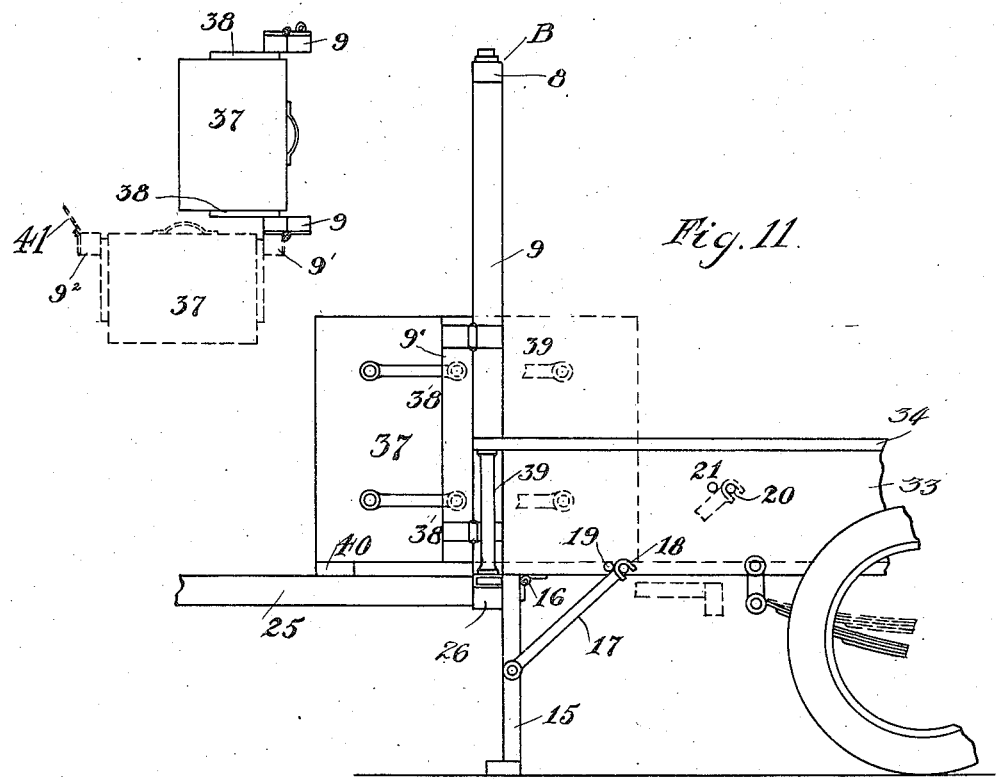
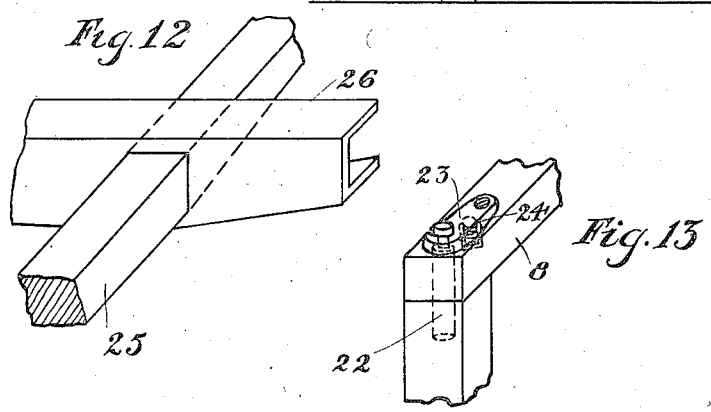
Inventor:
William P. Shattuck.
by C. P. Enochs
Attorney.

UNITED STATES PATENT OFFICE.

WILLIAM P. SHATTUCK, OF MINNEAPOLIS, MINNESOTA.

OUTING-TRAILER.

1,277,654.   Specification of Letters Patent.   Patented Sept. 3, 1918.

Application filed March 11, 1916. Serial No. 83,494.

*To all whom it may concern:*

Be it known that I, WILLIAM P. SHATTUCK, a citizen of the United States, residing at Minneapolis, in the county of Hennepin and State of Minnesota, have invented certain new and useful Improvements in Outing-Trailers, of which the following is a specification.

This invention is closely related to my co-pending Patent No. 1,229,534, June 12, 1917, filed January 13, 1915, but the subject of the invention of the patent aforesaid is excluded from the claims of this application, as the intention is only to protect in this application the improvements mainly in mechanical details over the patent aforesaid.

One object of my invention is to combine with an outing trailer an automatically self-adjusting shelf.

Another object of my invention is to provide in an outing trailer means for supporting a boat, canoe or similar craft.

Another object of my invention is to provide in an outing trailer a light, substantial and rigid body, so designed as to resist buckling, warping and winds that might, in use, be set up in the body.

Another object of my invention is to provide in an outing trailer a support for the body of the trailer when in camping position, means for utilizing the support as an end of the body when in traveling position, and incidental means for locking the support in either of the two positions.

Another object of my invention is to provide in an outing trailer a cooling box so mounted on the trailer as to be swung inside of the body of the trailer when in its camping position, and that it may be readily swung from that position to a position outside of the body of the trailer when the trailer is in a traveling position.

With these and incidental objects in view the invention consists of certain novel features of construction and combination of parts, the essential elements of which are hereinafter described with reference to the drawings which accompany and form a part of this specification.

Figure 1 is an end view of my improved outing trailer with the end of the tent portion removed, so as to better show the construction, and with a pair of hunting boats shown in dotted lines supported on the trailer.

Fig. 2 is a side elevation of a rear portion of my improved trailer showing the manner in which the end gate is used as a support for the body in camping position, and the manner in which the hunting boats are supported on the rear of the trailer.

Fig. 3 shows the end gate in its traveling position, and Fig. 4 is a detail of the buttons 1 in Fig. 2.

Fig. 5 is an enlarged detail, showing the construction of the shelves 2, Fig. 1, in a side elevation, and Fig. 6 is a top view of the same shelf.

Fig. 7 is a perspective view of a portion of the body itself removed from the trailer to show its unique construction, and Fig. 8 is a side elevation of a front portion of the body removed from the trailer, but with the tongue mounted on the body, while Fig. 9 is a bottom view of the front end of that portion of the body shown in Fig. 8, and Fig. 10 is a section on the line "AA," Fig. 9.

Fig. 11 is a side elevation of the front end of the trailer showing the manner in which the cooling box may be transferred from an inward to an outward position with respect to the body of the trailer. Fig. 12 is a perspective detail showing the manner in which the tongue passes into the body portion, and Fig. 13 is a perspective detail taken at the point "B," showing the manner of fastening the boat supports on the body. Fig. 14 shows an alternate construction of the shelf, while Fig. 15 is a plan view of the cooling box.

The shelf 2, Figs. 1 and 5, is hinged to the bow 3 by links 4 and 5, and the counter clockwise motion of the link 5 is limited by the stop pin 6 mounted in the bow 3.

The two links, each hinged at one end on the bow, and at the other end on the shelf, can be swung into a position (shown dotted) when the tent is being folded up and will tend to swing the shelf back into the position shown in Fig. 5, automatically when the shelter tent is again raised.

A brace 7 hooked on to stud 8, on the shelf 2 serves to stiffen the shelter tent, and is slipped in place when the tent is in an extended position, together with the braces 51.

As an alternate construction for the shelf 2, as shown in Fig. 14, I utilize the same link 4 hinged to the bow 3 and the shelf 2, similarly as shown in Fig. 5, but omit the link 5, and in place thereof I have the bayonet catch shown in Fig. 14, comprising the slot 5' and the button or pin 6', this construction allowing the shelf to be unhooked readily and either hung along the bow 3 or extended at an angle therefrom, as desired.

A cross bar 8, Figs. 1 and 2, is attached in any suitable manner to the upright posts 9 at the corners of the body of the trailer, and boats 10 carried by the two cross arms are held firmly by straps 11, thus carrying the boats securely and without taking up any room in the trailer in its traveling position, as shown in Fig. 2.

The end gate 12, Figs. 1, 2 and 3, may be swung from the traveling position, as shown in Fig. 3 to the downward position, as shown in Figs. 1 and 2, where it acts as a support for the body, and the latch 13 holds the end gate in whichever position it is placed and is prevented from jarring off of the stud 14 by the detent buttons 1, the action of which is more clearly shown in Fig. 4.

Supporting legs 15, Fig. 11, hinged to the body at 16, are pivoted on the front corners of the body of the trailer, and in camping position would be locked into place by the link 17, registering on the stud 18 and held in position by the detent buttons 19, of similar construction to the detent button 1.

For the traveling position the leg 15 is swung upwardly under the body of the trailer, in the position shown dotted in the trailer in Fig. 11, and the latch 17 hooked on to the stud 20, the detent button 21 holding it in its position.

Fig. 13 readily discloses the manner in which the bars 8 are attached to the upright posts 9, 22 being a button ended stud fastened in the post 9, 23 a latch, and 24 a detent button of the same type as button 1, adapted to hold the latch in a locked position.

The tongue 25, Fig. 12, passes through the front brace 26 of the body and is securely anchored to the center of the body between the wind resisting cross braces 27, Fig. 9, by bolts 28, which clamp the two spacing channel plates 36 firmly between the cross braces 27, and the tongue 25 is secured by bolt 31. An opening 29 is provided in the floor 30 of the car to facilitate the removal of the bolt 31, so the tongue may be removed, this opening being normally covered by the plate 32 fastened to the floor in any suitable manner.

The body of the trailer is formed of two side members 33, Fig. 7, preferably having a bead 34 folded at the outward edge, and carried between the two side members the floor boards 35 are bolted or otherwise suitably attached to the side members 33, to insure a solid, rigid union of the two side members.

A cooling box 37, Fig. 11, has pivotally mounted thereon a pair of links 38 on either side, the links being pivotally mounted on the posts 9' and $9^2$, and the post 9' being hinged to the post 9, and the post $9^2$ being latched to the post 9 on the other side of the trailer, so that the cooling box may be swung to the position shown in Fig. 15 to make it readily accessible when the trailer is in a traveling position, and will be solidly carried by the posts 9 when the post $9^2$ is latched to the post 9 by the latch 41, of any ordinary construction.

With the box in the traveling position, as shown in Fig. 11, when camp is made it can be swung upwardly and inwardly, the links turning on the pivots of the post and the cooling box until it assumes the dotted position shown in Fig. 11, so that while it is inside of the tent when in a camping position it can be swung outwardly from the trailer so that it is supported on the tongue 25 by the block 40, and entirely outside of the body in the traveling position, so that it will not interfere in any way with the trailer when the shelter tent is being closed.

While I have described my invention and illustrated it in one particular design, I do not wish it understood that I limit myself to this construction, as it is evident that the application of my invention may be varied in many ways within the scope of the following claims.

Claims:

1. In an outing trailer the combination of a pair of supporting wheels, a body, a shelter tent, bows attached to said shelter tent, and adapted to swing said shelter tent from a folded to an extended position, and a link mounted shelf carried on one of said bows and adapted to swing from a position substantially parallel to said bow to a horizontal position.

2. In an outing trailer the combination of a body, a shelter tent, bows supporting said shelter tent on said body, an adjustable shelf attached to each of two of said bows, and a brace between the two shelves adapted to maintain the shelves in position and to maintain the tent in an extended position.

3. In an outing trailer the combination of a body, four upright posts, one at each of the four corners of said body, a cross bar connecting the two upright posts at the rear of said body, and a second cross bar connecting the two upright posts at the front of said body, said cross bars being adapted to carry a craft, and a latch for maintaining said cross bars in position on said upright bars.

4. In an outing trailer, a trailer body comprising two side members each formed of a metal sheet substantially Z shaped in section the upper flange forming a flare board and floor members extending between the lower edge of said side members and fastened thereto.

5. In an outing trailer, a trailer body, comprising two side members of substantially Z shaped cross section, floor members connecting said side members and attached thereto, and a pair of cross braces formed into substantially a V shape, one end of each V shaped brace being attached to two corners of said body, and the central portions of said V shaped braces being rigidly joined together.

6. In an outing trailer the combination of a body comprising two side members and a floor extending between said side members and attached thereto, and a pair of truss braces formed into a V shape, one end of each of said truss braces being joined to the two corners of said body, a spacing plate between the central portion of said truss braces, means for clamping the truss braces tightly to said spacing plate, a tongue passing between the central portion of said truss braces, and means for fastening said tongue to said spacing plate.

7. In an outing trailer having a body, the combination of a box, vertical posts carried by the body of said trailer, a post hinged to one of said vertical posts, a link joining said box with said hinged post, a link on the other side of said box, a post hinged to said link, and latching means for attaching said post to a vertical post on that side of the trailer body.

8. In an outing trailer having a body, two vertical posts, a box supported at one side on one of said posts and adapted to be revolved in a horizontal plane thereon, means for attaching the other side of said box to the second of said posts, and means for swinging said box from a position on one side of a line connecting said posts to a position on the other side of the same line connecting said posts.

9. In an outing trailer having a body, two vertical posts attached to said body, a box mounted by double hinged connection to one of said posts, so as to allow it to be swung on said post in a horizontal plane or a vertical plane, and means for coupling said box to the second of said posts, without interfering with the vertical swinging thereof.

10. In an outing trailer the combination of a pair of supporting wheels, a body, a shelter tent, bows attaching said shelter tent to said body and adapted to swing said shelter tent from a folded to an extended position, an upright post on said body, and a link adapted to engage one of said bows with said upright post to stiffen said shelter tent when in an extended position.

11. In an outing trailer the combination of a pair of supporting wheels, a body, a shelter tent, bows attached to said shelter tent adapted to swing said shelter tent from a folded to an extended position, a shelf carried by said bows and adapted to stiffen said bows when they are in an extended position.

WILLIAM P. SHATTUCK.